United States Patent [19]

Price, Sr.

[11] 4,408,956
[45] Oct. 11, 1983

[54] FLIP-FLOP TURBINE VANE MODULE

[76] Inventor: William F. Price, Sr., 705 S. Fourth St., Folkston, Ga. 31537

[21] Appl. No.: 325,545

[22] Filed: Nov. 27, 1981

[51] Int. Cl.³ .............................................. F03D 1/06
[52] U.S. Cl. .................................... 416/119; 416/140
[58] Field of Search .................... 416/119, 111, 140 R

[56] References Cited

U.S. PATENT DOCUMENTS

| 266,524 | 10/1882 | Reiter | 416/119 X |
|---|---|---|---|
| 498,068 | 5/1893 | Lonning | 416/119 X |
| 1,008,372 | 11/1911 | Seelye | 416/119 |
| 1,017,002 | 2/1912 | Kelly | 416/119 |
| 1,036,109 | 8/1912 | Haslinger | 416/119 X |
| 1,074,011 | 9/1913 | Partain | 416/119 X |
| 1,772,119 | 8/1930 | Van Lammeren | 416/108 |
| 2,038,467 | 4/1936 | Zanoski | 416/119 X |
| 2,406,268 | 8/1946 | Terhune | 416/119 X |
| 3,912,937 | 10/1975 | Lesser | 416/119 X |
| 4,015,911 | 4/1977 | Darvishian | 416/119 |

FOREIGN PATENT DOCUMENTS

| 1028626 | 3/1978 | Canada | 416/17 |
|---|---|---|---|
| 138437 | 2/1903 | Fed. Rep. of Germany | 416/119 |
| 537312 | 5/1922 | France | 416/119 |
| 586270 | 3/1925 | France | 416/111 |
| 748194 | 6/1933 | France | 416/111 |
| 921518 | 5/1947 | France | 416/111 |

Primary Examiner—Everette A. Powell, Jr.

[57] ABSTRACT

This disclosure relates to a method of generating power by movement produced by moving wind or fluid to thrust into circular rotation a rotatable framework from which such power can be extracted, being a Fluid Motion Vane Module which, operating in conjunction with an opposite companion same Fluid Motion Vane Module, or with multiples of said Fluid Motion Vane Module in opposing relationship will extract power for almost 300 degrees of the 360 degree rotation, the continuing changing aspects of said Vane Module being caused by its changing circular position and the fluid or wind thrust upon component vanes causing into-wind vane component feathering removing almost all into-wind frictional drag, continued changing in angular aspects in relation to wind direction to cause into-wind tacking, across-the-wind angular driving, down-wind direct drive, said tacking and across-the-wind angular driving being present both on up-wind and down-wind sides of said supporting rotatable framework.

1 Claim, 4 Drawing Figures

FLIP-FLOP TURBINE VANE MODULE

Working to improve the windmill I submit an improvement using modules having wings (similar to aircraft wings) said modules mounted rotatably in pairs upon a larger rotatable frame similar to a merry-go-round, the larger wheel like frame rotating horizontally needing no directional orientation or mounted in a ferris-wheel like frame which would need orienting windward. Module framing top and bottom have spaced stopping studs to allow modules rotatable motion to be stopped at satisfactory wind using angles upon the larger rotatable mounting support frame.

This improvement takes the sailboat upon a track innovation of years ago and placing it upon a circular rotating framework and adding an additional vane (sail) upon said sailboat in an unobvious location causing it to change its course under wind (or water) pressure by 40 to 60 degrees upon its piviot point and adding an additional vane upon said same sailboat to add surface area into wind thrust. Such a module can be made in a very large size and mounted upon a very strong supporting framework.

Improvement in this invention has to do with the said vane module, its being entirely new to the windmill or fluid motion turbine, this vane module having three vanes, one of which is fixed as part of said module framework and two additional vanes, which in addition to adding surface area for the wind to push also cause said vanes and the entire module to continuously change aspect to the wind force so that as well as being pushed during the downwind rotation as most horizontal windmills are, the vane modules also tack into the wind on the upwind chord pushing the framework upon which said modules are mounted for almost 300 degrees of the 360 degrees of available wind or fluid power.

Other improvements include unlimited surface area for size to securing wind power and ability of said vane module to be used on any framework where it may be mounted parallel to the axis of the center point of said framework and a spaced distance from said axis of said center point and rotatable on its points and stoppable at angles 20 to 30 degrees inside the tangental line formed at said piviot point joining said vane module to said holding framework and to 20 to 30 degrees outside said same tangental line.

BRIEF DESCRIPTION OF THE INVENTION

DETAILED DESCRIPTION OF THE INVENTION

Figure 1:
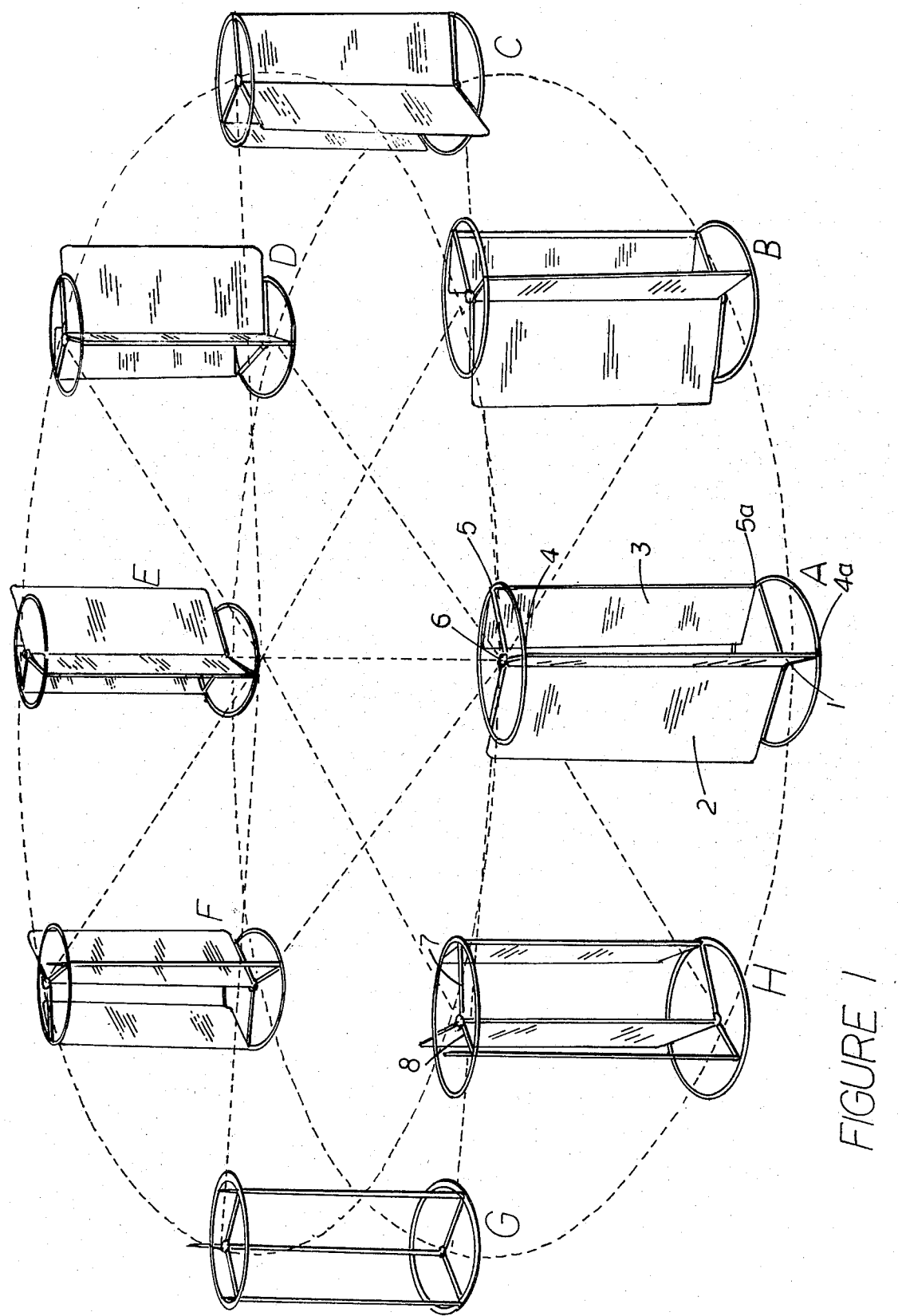
FIG. 1 is a perspective of eight modules as they would be mounted on a merry-go-round like framework.

FIG. 1. A perspective view from upwind of eight modules as if mounted in a circular framework similar to a merry-go-round for horizontal counterclockwise rotation, each module showing aspect presented to fluid movement when module limiting stops are activated. This invention can move clockwise or counterclockwise with only a shift in stops. It is selfstarting.

Module limiting stops are adjustable studs or like projections which protude from the module framework, said studs can be restrained by a device upon module supporting framework which limit said module within a selected angular rotation which said studs can be freed by removing said restraining device, moving said restraining device making module rotatably free to feather into currents of liquid or air.

To understand operation, the aspect of each module to wind or fluid at its location around the circular movement of the supporting framework must be described;

If only two said modules are mounted upon an H supporting framework with the arms and legs of said H supporting framework of equal length, the dash of the H in vertical position, the modules mounted vertically in the arms on one side, the legs on the opposite side the dash of the H supporting frame being at 90 degrees to the wind direction, that direction being the visual viewpoint, modules being in the A and E positions of FIG. 1 in my drawings, as a beginning In module A position wing 2 and 3 are diagonal to the wind, wing 1 lying trailing edge in contact with leading edge of main wing 2, all in driving position to wind. At vane E the exact opposite, pushing counterclockwise but at the module E position vane 1, which was closed at position A is now in driving position, wing 3, which was in driving position at position A is now approaching feathered position.

At B and F positions the said module at B position has been revolved by the circling of the framework so that all three wings are pushing, at the F position wings 2 and 3 are in tacking position, wing 1 at feathered position.

At C and G positions; at C wings 1 and 2 are closed trailing edge to leading edge receiving maximum wind thrust (wing 3 often takes this closed position at the C position). At position G that module has all three vanes feathered.

Just past position C wing 1 of that module begins to receive more thrust from the wind or fluid than the wing 2 which is becoming more parallel to the following wind and this thrust upon wing 1 causes rotation upon piviots 6 and 6a which thrusts the vane module into the D position.

At D and H positions at D wings 1 and 2 are in strong driving position, wing 3 is closed trailing edge against the leading edge of wing 2 also driving. At the H position wing 1 is still feathered into wind, wing 2 and 3 are again in driving position at a tacking angle.

Figures 2, 3:
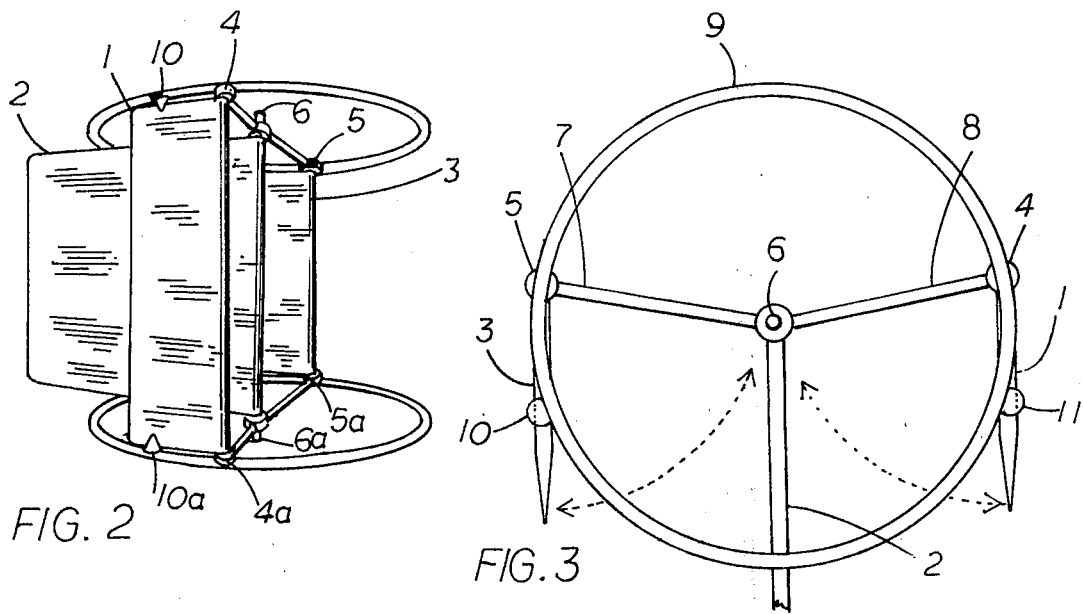
FIG. 2 is perspective of module.
FIG. 3 is downward vertical view of module, wings in parallel feathered position.

FIG. 2 is perspective of module showing primary wing 2, the two auxiliary wings 1 and 3, module studs 6 and 6a which mount module to supporting framework, module studs 6 and 6a being inserted into bearings of rotating supporting framework, bearing mounts 4, 4a, 5, 5a for wings 1 and 3 on module framework, and auxiliary wing limiting stops 10, 10a, to rotation of auxiliary wing 1 (stops 11 and 11a not seen this view) spokes 7 and 8 which hold ring mount (if such a mount is used) in position.

FIG. 3 is view vertically down upon module showing top of primary wing 2, auxiliary wings 1 and 3, dotted arrow lines showing rotatable amount of movement of auxiliary wings 1 and 3, show movement being stopped on contact with primary wing 2 in inner direction and stops 10 and 11 (10a and 11a not shown) outward direction. Bearings 4 and 5 for auxillary wings and stud 6 which mounts module to module support framework.

Figure 4:
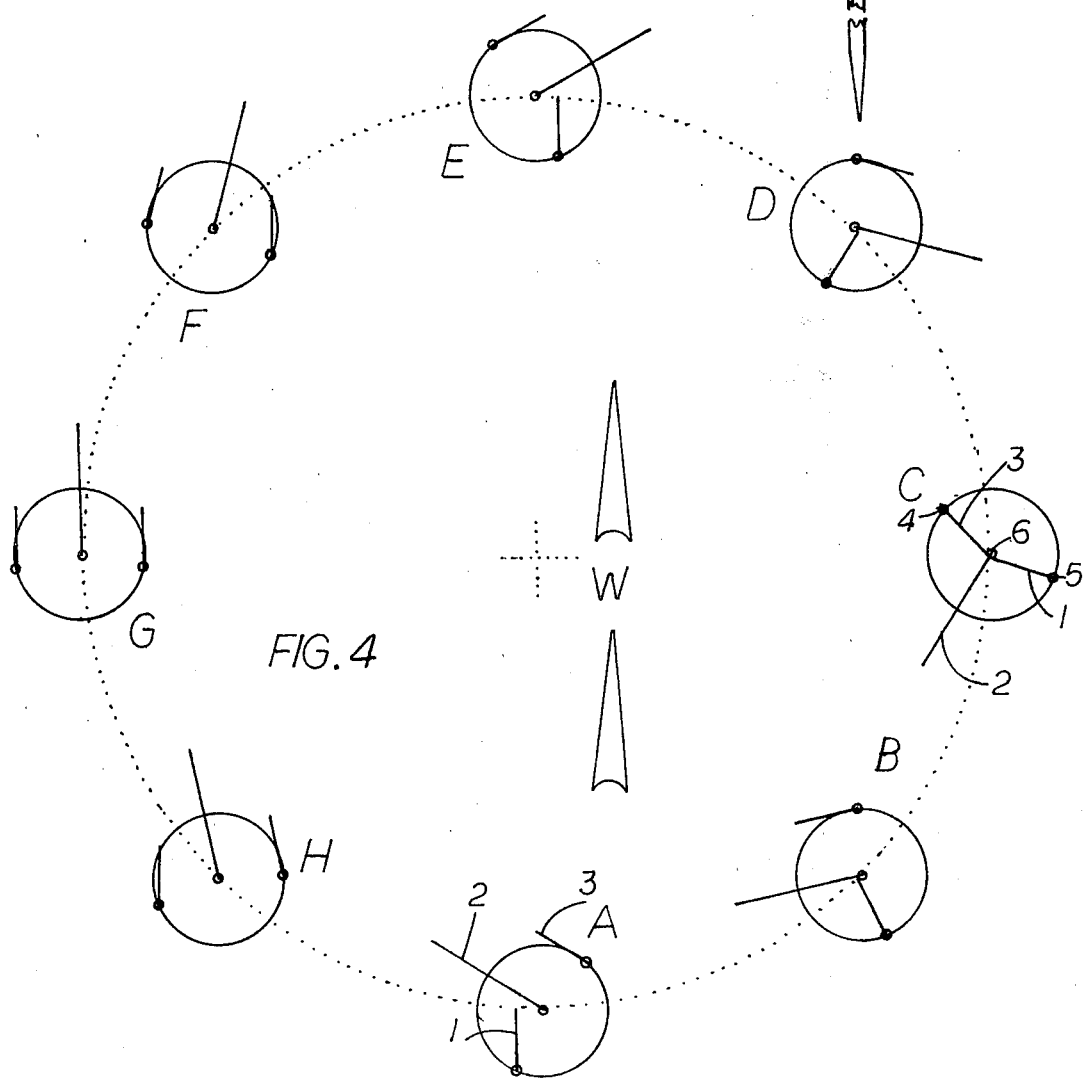
FIG. 4 is view from above or below of mounted module as if mounted on a horizontal movement framework in wind direction shown.

FIG. 4 is depiction from vertical of 8 modules in position as if mounted in horizontally rotating framework and module aspects as described in FIG. 1.

Construction of said vane modules may be of material similar to thin wall conduit for framework for main spar and ribs in the manner of a ladder, the material opposite the leading spar being such as quarter inch rod, welded or brazed together, that framework being covered with a material such as valley aluminum (16 gauge or similar) or cloth. Entire wings could be made of wood or plastic. The bottom and top vane framing can be made of the same thin wall conduit bent to suitable shape or like a T with a lower crossbar, the upper crossbar holding bearing ends for auxilliary vanes, the lower crossbar lengthly enough to hold the stops to restrain said auxilliary wing rotary movement. The main wing must be fastened to the vertical line portion of the T and mounting means for module on the top and bottom of module framing just below and above leading edge of said main wing, being rods affixed, said round rod studs of a proper size to be fitted into the supporting framework bearings when module is mounted in said supporting framework for use. Wing sizes are not critical but auxilliary wings must be a bit less in width than said main wing, said main wing not too wide since strong centrifugal action during circular rotation will cause poor operation. Auxilliary wings may be made the same as main wing and of the same material with axle rods above and below their leading edges to be mounted into bearings at the outer ends of the upper crossmark of the T framing of the vane module, the mounting such they will rotate inward less than 90 degrees, their trailing edges closing to the leading edge of said main wing and opening outward to a stopped parallel to the main wing surface. When assembled this entire vane modules piviot points mounted into rotatable bearings on said supporting H frame are able to rotate in a circle freely except when properly stopped during operation. Stop studs or devices should be mounted upon the module framework in a position to cause said main wing surface to be held within 20 to 30 degrees inside a tangental line and 20 to 30 degrees outside said tangental line of the circle made at the module mount piviots. When mounted upon the supporting framework a moveable or removeable device must be attached to said supporting framework to cooperate with above said stops to limit angular movement of said modules, its removal making said modules free to feather into wind or fluid.

The invention having been described what is claimed is:

1. In a system for capturing energy from air or fluid motion having a rotatable framework containing equal length supporting arms and legs similar to an H with said H cross-mark being the piviot point and having bearing connections at the ends of said arms and legs, cross-mark of said H being 90 degrees to wind direction, a *FLUID MOTION TURBINE VANE MODULE* working with an oppositely same said *FLUID MOTION TURBINE VANE MODULE* upon said rotatable supporting H framework for movement in a circular motion around the said H cross-mark piviot point, said turbine vane module comprising a main surface area wing mounted leading edge center said main surface area wing being a part of said module framework, having rod axles mounted top and bottom center said module framework for mounting said entire vane module in a parallel spaced relation from said pivioting point H of said supporting rotating framework said vane module bearing mounting method upon said supporting H framework allowing free pivioting at said spaced distance of said module from said piviot point of said supporting H framework said fluid motion vane module having a method of restricting its pivioting in relation to said H rotatable supporting framework to 20 to 30 degrees inward and 20 to 30 degrees outward the tangent of the circular rotation at the said H rotatable supporting framework bearing into which said fluid motion vane module is mounted said module framework structure having extensions emerging laterally both top and bottom approximately 90 degrees in both directions from the width sides said main surface area wing extending outwardly sufficiently to support two auxilliary wings of about 66 percent the width said main surface area wing so when said auxilliary wings leading edges mounted in piviotal bearings, said bearings being part of and near the outward portions of said extensions and forward leading edge said main surface area wing by about 10 to 20 degrees, are able to piviot from a stopped position surfaces parallel said main surface area wing, stops being mounted upon said lateral extensions at positions about the same distance laterally as said bearings and less distant trailingly than said auxilliary wing width to said auxilliary wings trailing edges pivioting closed against and near said main surface area wing leading edge said vane module operation being characterized by the continuing change of angular aspect in respect to wind direction and the changing position of its component wings such being that, for the 60 degrees of into-wind all wings are feathered to wind to present little drag, then about 30 degrees windward said H piviot point of said supporting structure at least two said component wings begin tacking into a diagonal position pushing strongly into wind, cross-wind the outer component auxilliary wing closes upon the main surface area wing causing additional thrust, upon beginning travel downwind chord, said outer auxilliary wing causes the inner aspect of said main surface area wing and said module framework to flip rotatingly outward, said inner auxilliary wing adding driving surface area by closing its trailing edge inward to the leading edge of said main surface area wing then across down-wind rotation said wings receive diagonal thrust in opposite direction across the down-wind chord said supporting framework circular movement, finally said component wings being thrust into tacking position forwardly thence into the into-the-wind feathered position.

* * * * *